United States Patent
Clark et al.

(10) Patent No.: US 6,601,184 B1
(45) Date of Patent: Jul. 29, 2003

(54) SYSTEM CRASH NETWORK ACCESS

(75) Inventors: Sheffer Clark, Springville, UT (US); Alan Blauer, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/526,040

(22) Filed: Mar. 14, 2000

(51) Int. Cl.⁷ .................................................. H02H 3/05
(52) U.S. Cl. ................................................ 714/4; 714/43
(58) Field of Search .................................... 714/4, 43

(56) References Cited

U.S. PATENT DOCUMENTS

| | | | |
|---|---|---|---|
| 4,589,068 A | 5/1986 | Heinen, Jr. | |
| 5,179,695 A | 1/1993 | Derr et al. | |
| 5,355,498 A | 10/1994 | Provino et al. | |
| 5,394,544 A | 2/1995 | Motoyama et al. | |
| 5,434,998 A | 7/1995 | Akai et al. | |
| 5,473,599 A * | 12/1995 | Li et al. | 370/219 |
| 5,537,653 A | 7/1996 | Bianchini, Jr. | |
| 5,608,867 A | 3/1997 | Ishihara | |
| 5,630,049 A | 5/1997 | Cardoza et al. | |
| 5,701,488 A | 12/1997 | Mulchandani et al. | |
| 5,809,248 A | 9/1998 | Vidovic | |
| 5,812,748 A * | 9/1998 | Ohran et al. | 714/4 |
| 5,815,653 A | 9/1998 | You et al. | |
| 5,832,503 A | 11/1998 | Malik et al. | |
| 5,870,540 A | 2/1999 | Wang et al. | |
| 5,870,601 A | 2/1999 | Getzlaff et al. | |
| 5,958,049 A | 9/1999 | Mealey et al. | |
| 5,964,891 A | 10/1999 | Caswell et al. | |
| 5,974,562 A * | 10/1999 | Townsend et al. | 714/4 |
| 5,978,936 A | 11/1999 | Chandra et al. | |
| 6,000,041 A | 12/1999 | Baker et al. | |
| 6,199,033 B1 * | 3/2001 | Tanaka | 703/23 |
| 6,453,426 B1 * | 9/2002 | Gamache et al. | 714/4 |

* cited by examiner

*Primary Examiner*—Robert Beausoliel
*Assistant Examiner*—Michael Maskulinski
(74) *Attorney, Agent, or Firm*—Mintz Levin Cohn Ferris Glovsky and Popeo PC

(57) ABSTRACT

The present invention provides a debug-time network environment that enables access to a computer system that has crashed where communication over regular network channels is halted. The debug-time network environment may provide a module loader that loads a copy of a network device driver into memory and dynamically links it into the debug-time network environment. The network device driver may be the same driver used during run-time. The copy of the network driver is loaded into memory prior to a system crash where it is kept in reserve. After a system crash, the final initialization of the copy of the network driver kept in reserve may take place. The debug-time network environment provides an emulated Operating System Application Program Interface ("OS API") where the emulated OS API enables the driver to initialize, transmit and receive network packets. This emulated environment may also provide one or more network protocols and application interfaces to support debug-time network applications, such as system core dumps, remote debug access, crash diagnostics and repair, and other applications.

20 Claims, 2 Drawing Sheets

SYSTEM CRASH NETWORK ACCESS

FIELD OF INVENTION

The present invention relates to the field of network servers, more particularly to enabling a crashed computer system to communicate over a network where an external entity may remotely communicate with, diagnose, and repair the dead system.

BACKGROUND OF THE INVENTION

Generally, when a computer system experiences a crash, halt, or other impairment, critical and important data may become corrupted. For example, when a server can no longer access certain critical data, that server's state is considered compromised. When a compromised state is detected, the server system may block any further operations to prevent further data corruption. This is often called a server crash. This involves stopping all code execution and preserving the contents of the server's memory at the state they are in when the critical error occurs. At this state, the server is unavailable to handle requests. Critical processes on the server are unable to initiate or complete execution. The server remains inoperative until the system crash is properly addressed and corrected. Such a server is often referred to as a dead server. Where time is of the essence, a system crash may result in irreparable consequences. While a server reboot may bring the system back to running condition, time, data and other information may be irretrievably lost.

Further, even if a server reboot is performed, if the system has impairments, server crashes could continue to occur. Server impairments, whether partial or total, cause downtime and lost productivity. In most cases, nothing can be done to keep the server in constant and proper operation until a resolution is found, which generally involves diagnosis and repair of impaired server conditions.

One element useful in diagnosing a server fault is a core dump. A core dump is a byte-for-byte image of a server's memory, essentially a snapshot of a server's RAM at a particular point in time. The process of copying an image of a system's memory may be referred to as dumping core memory or making a core dump. When an error occurs on the system, the core dump may contain information about system activities and the state they were in when the critical error occurred. System activities may include processes, loaded modules, allocated memory, cache memory, screen shots, and other information. In the past, core dumps were done to disks or other transportable storage media. Due to the size of server memories, however, that technique is generally impractical. Further, that technique requires an operator to be physically present with the server to take the disk to be used for diagnosis.

Accordingly, techniques have been developed to enable a core dump to be performed over a network to a large storage device for diagnosis. Generally, these techniques involve running a LAN or other network driver from the server machine to download data from the server out over a LAN or other network.

A dedicated network driver may be hard-coded into an operating system debugger to be used when there is a system crash. However, this technique entails converting a user's currently existing driver to handle the necessary debug-time constraints, and is limited to a specific network topology. With the large number of different types of drivers in commercial use, the conversion of each different type of driver into a debug environment is an unrealistic commercial option.

These and other drawbacks exist with current systems.

SUMMARY OF THE INVENTION

An object according to the present invention is to overcome these and other drawbacks with existing systems.

Another object of the invention is to provide a debug-time network environment to allow access to a server that has crashed (i.e., all processes have halted) and can no longer communicate over its regular network channels.

Another object of the invention is to enable users to utilize existing LAN drivers to create an environment on a server where packets of information may be transferred in and out, at the time of system failure.

Another object of the invention is to load a copy of a network driver already operating on the server into memory, dynamically link it into a debug-time network environment prior to a system crash, and keep it in reserve for use after a system crash to enable network communications with that server.

Another object of the invention is to provide an emulated operating system ("OS") environment to enable a network driver to initialize, transmit, and receive network packets as well as other functions and operations, at the time of a system crash. The emulated environment may include network protocols and application interfaces so the network driver operates as if it were under control of the server operating system rather than an emulated module.

According to an embodiment of the present invention, a debug-time network environment is provided that enables access to a server system that has crashed where communication over regular network channels is restricted. The debug-time network environment may provide a module loader that may be independent of the run-time OS environment. The module loader may load a copy of a network driver into memory and dynamically link it into the debug-time network environment. The network driver may be one of the drivers operated by the server OS during run-time and normal operations. The copy of the network driver is loaded into memory prior to a system crash where it is kept in reserve. After a system crash, the final initialization of the copy of the network driver kept in reserve may take place. This enables the network driver to operate as it would under normal operating conditions. Other methods of invoking a copy of the network driver may also be employed.

The debug-time network environment also provides an emulated Operating System Application Program Interface ("OS API") where the emulated OS API enables the network driver to initialize, transmit and receive network packets. This emulated environment may also provide one or more network protocols and application interfaces to support debug-time network applications, such as system core dumps, remote debug access, crash diagnostics and repair, and other applications. By utilizing off-the-shelf network drivers, existing drivers do not have to be reconfigured or converted to support the communication to a network from a dead system. The ability to use off-the-shelf drivers provides flexibility and convenience.

Other objects and advantages of the present invention will be apparent to one of ordinary skill in the art upon reviewing the specification herein.

DETAILED DESCRIPTION OF THE PREFERRED EMBODIMENTS

The present invention enables partially or fully impaired nodes, such as networked servers, to communicate with other nodes on the network while the node is still down. This invention provides numerous benefits and capabilities to downed nodes in a network. For example, in clustered architectures, a downed node may immediately notify other nodes connected to the network that it is down so other nodes do not attempt to communicate with the downed node. Within a network domain, diagnostic and repair services may restore downed nodes more efficiently and conveniently. Network transport infrastructures may adapt in "real time" to a dynamic topology. Heterogeneous networks may support remote debugging and network core dumps. Other advantages and benefits exist.

The present invention provides a debug-time network environment to allow access to a computer system that has crashed where communication over its regular network channels is no longer possible.

Figure 1:
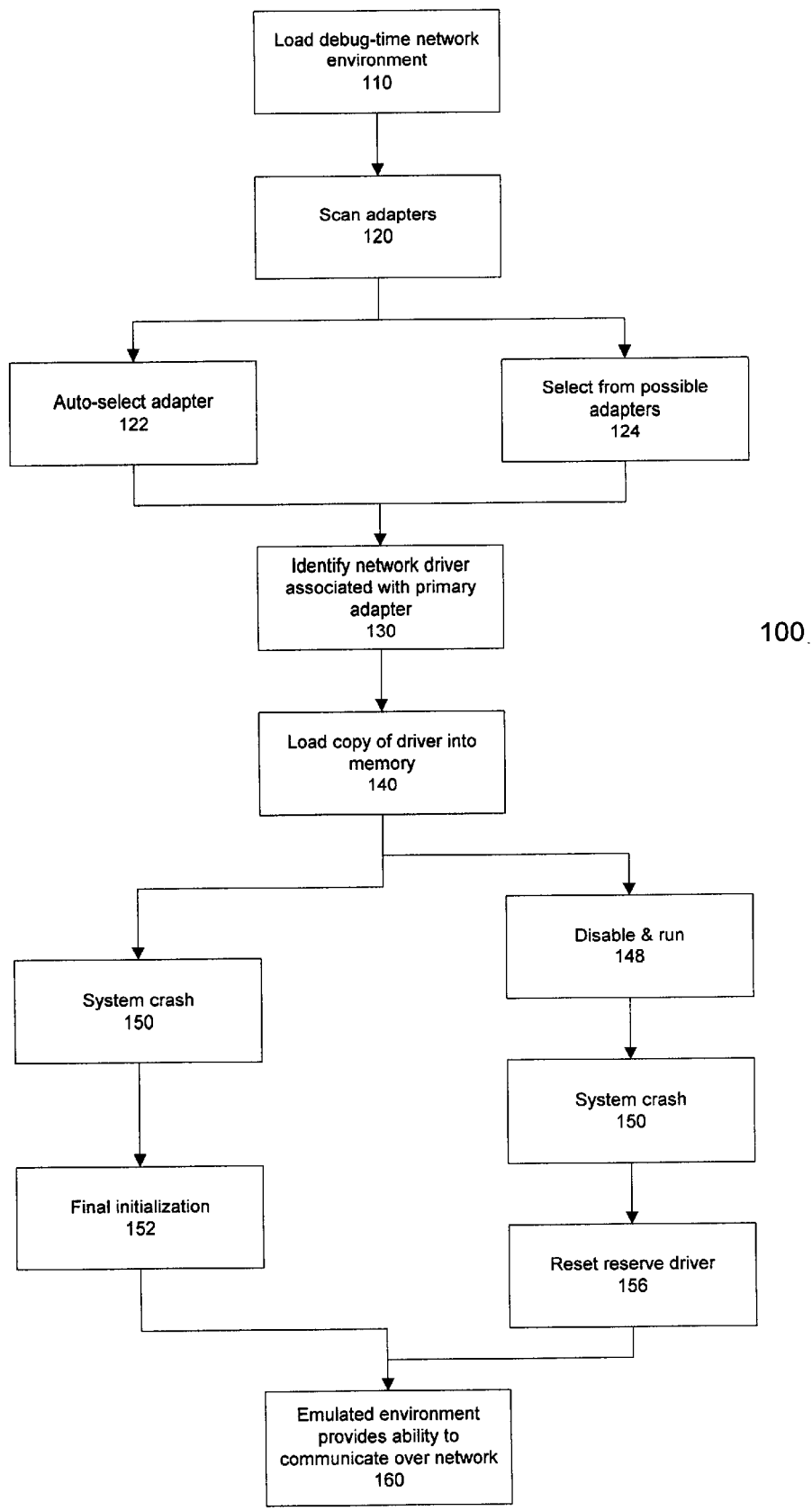
FIG. 1 is a flow chart of a method of operation according to an embodiment of the present invention.

FIG. 1 illustrates a flowchart of a method 100 for enabling communication with a dead node over a network according to an embodiment of the present invention. Step 110 may involve loading emulation software to support the debug-time network environment of the present invention as described below with respect to step 160. This step may be accomplished while the server is operating and functioning properly.

In step 120, the server system is scanned to identify any adapters (or boards) connected to the network and their associated (or bound) network protocols over which communication can occur in the event of system crash. For example, the network protocol may be TCP/IP, IPX/SPX, or other network communication protocol. In one embodiment, it may be preferred to transfer a core dump over the Internet using TCP/IP. In this embodiment, scanning may involve determining which adapters enable TCP/IP communication. To do so, different methods may be performed. For example, in step 122, the software may attempt to automatically configure itself by scanning for any network board bound to the desired network protocol (e.g., TCP/IP) and then, in the case of TCP/IP, select one that is on the same network as a default router, if such exists.

Also in step 124, if an adapter cannot be singled out according to a predetermined criteria, an installer may select an adapter from a list of boards bound to a preferred protocol. If the desired communication protocol is not loaded, the system may scan all available network boards and display a list of all boards that may support the protocol. In the case of IP, the user may then be prompted for an IP address, mask, and default router. If no boards are found, an error message may be displayed. If other communication protocols are selected, other information may be requested for the device by which communications would occur.

In step 130, the primary adapter connected to the network, or Internet, identified by step 122 or step 124 may be used to identify its associated network driver.

In step 140, a module loader may load a copy of the identified network driver into memory (the "reserve network driver"). To avoid a server crash corrupting the copy of the identified network driver, that copy may be stored in a protected portion of memory. For example, the reserve driver may be loaded in an area of physical memory that is then made inaccessible to other system applications thereby protecting it from corruption. On a processor, memory may be protected by designating (e.g., marking) it as "not present" in the processor's memory page tables. In another example, the copy may be stored on a protected partition (e.g., DOS partition). Other forms of providing a protected portion of memory may also be employed. The module loader may be independent of the run-time OS system environment. The reserve network driver may be an exact copy of the network driver used during run-time. Once the reserve network driver is loaded into memory, it may be dynamically linked into the debug-time network environment. The reserve network driver may be kept in reserve to be invoked in the event of a system crash 150.

The reserve network driver usually is initialized prior to its use. This initialization may also be done before or after a system crash.

In one embodiment, final initiation may occur after a system crash. Under final initialization after a system crash 150 in step 152, a final initialization of the reserve driver may take place for proper driver operation. It may also be desired to initialize the reserve driver prior to a system crash. In this embodiment, a disable & run method as in step 148 may be performed, prior to system crash 150. In this method of step 148, while the server is operating properly, a run-time driver for the selected adapter may be disabled. During that time period, in an environment similar to a server crash, the reserve network driver may be initialized and run to ensure proper operation. Upon approval of the operation of the initialized reserve network driver, the initialized reserve network driver is disabled and the run-time driver is awakened to resume normal operation. After system crash 150, in step 156 the initialized reserve network driver may be reset to enable network communications.

Figure 2:
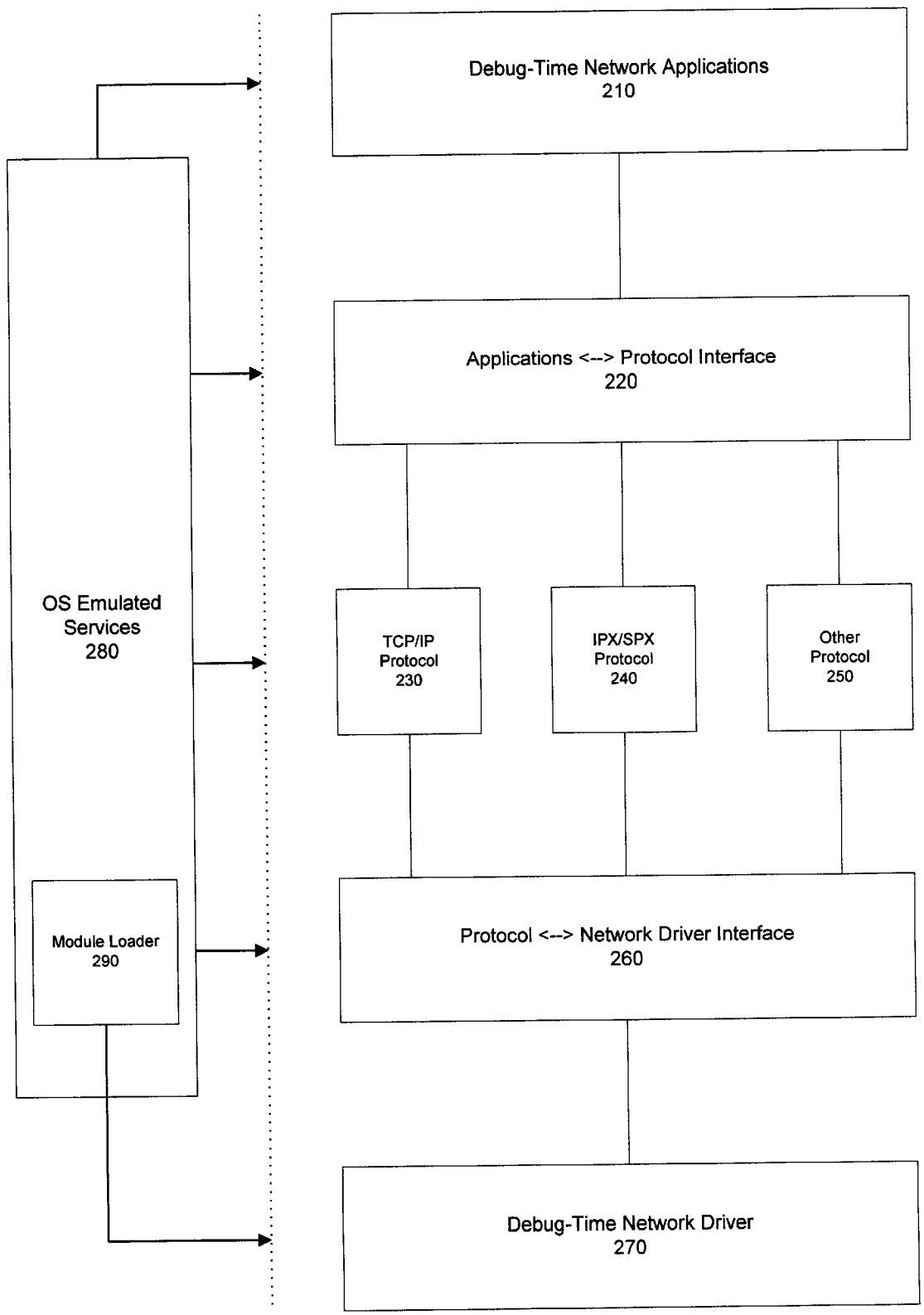
FIG. 2 is a block diagram of a debug-time network environment provided by a debug-time network environment according to an embodiment of the present invention.

To enable proper operation of the driver after a system crash, the debug-time network environment provides an emulated OS API for the reserve network driver to initialize, transmit, and receive network packets. In step 160, the emulated OS environment provides the ability to communicate over a network when the server is down. This environment may also provide network protocols and an application interface to support debug-time network applications, as shown in FIG. 2. In the emulated OS environment, the copy of the driver functions as if the server is running, as it would under normal operation. In other words, the driver does not know the server is dead. Before the driver is copied into memory, the functions and operations necessary for the driver to operate are identified. A response for each function and operation is provided in the emulated OS environment to enable the driver to function properly, after a system crash.

When the reserve network driver is loaded and linked into the debug-time network system where the driver may import a function of memory reference from the emulated OS API, the emulated API may supply the reference and provide an appropriate response when the reference is invoked. When the reference is available and the appropriate response is given, the driver will function properly. For example, if the driver normally has server system calls that return one of several values, the emulation module provides a response for each system call that will be sufficient to enable the core dump to take place over the Internet. Because servers have pre-defined calls, the emulation module may be provided with a response to all available calls so any driver used will get a response that enables it to perform the core dump.

FIG. 2 illustrates a debug-time network environment according to an embodiment of the present invention. OS Emulated Services 280 enables the reserve network driver to function as it would under normal conditions, after a system crash. The emulated environment provided by OS Emulated Services 280 allows the driver to initialize, transmit, and receive network packets along with other functions and operations. This environment may also provide one or more network protocols and one or more application interfaces to support debug-time network applications. Applications supported by the debug-time network environment may include Debug-Time Network Applications 210, such as system core dump ability, remote debug access, crash diagnostics and repair, and other operations. A reserve network driver may be shown as Debug-Time Network Driver 270. Debug-Time Network Driver 270 may include Ethernet/Token-Ring/FDDI, etc. The driver 270 may be loaded by Module Loader 290 and linked into the debug-time support environment prior to a system crash. The driver may be independent of run-time drivers.

Protocols may comprise TCP/IP Protocol 230, IPX/SPX Protocol 240, and other Network Protocols 250. Applications Protocol Interface 220 and Protocol Network Driver Interface 260 may also be provided.

Protocols may involve a set of rules that network devices follow in order to communicate. These protocols may specify the formatting, timing, sequencing, and error checking of data transmission. TCP/IP or Transmission Control Protocol/Internet Protocol 230 includes TCP (Transmission Control Protocol) as the primary transport protocol and IP (Internet Protocol) as the network layer protocol. By using TCP/IP, different types of computers may communicate and exchange information.

IPX/SPX Protocol 240 involves IPX or Internetwork Packet Exchange as the network layer protocol for allowing the exchange of message packets on an internetwork and SPX or Sequenced Packet Exchange as a transport protocol by which two workstations or applications communicate across the network. SPX uses IPX to deliver the messages where SPX delivers of the messages and maintains the order of messages on the packet stream.

Other embodiments and uses of the invention will be apparent to those skilled in the art from consideration of the specification and practice of the invention disclosed herein. The specification and examples should be considered exemplary only.

What is claimed is:

1. A method for enabling communication over a predetermined network to a computer system that has crashed, comprising the steps of:
   identifying a network driver connected to the predetermined network;
   creating a reserve copy of the network driver in memory prior to a system crash;
   invoking the copy of the network driver after a system crash; and
   providing an emulated environment to enable the copy of the network driver to initialize, transmit, and receive network packets.

2. The method of claim 1 wherein the reserve network driver is an exact copy of the run-time network driver.

3. The method of claim 1 wherein the step of identifying a driver connected to a network comprises scanning adapters to automatically detect an adapter connected to the predetermined network.

4. The method of claim 1 wherein the step of identifying a driver connected to a network comprises selecting an adapter connected to the network from a list of possible adapters.

5. The method of claim 1 wherein the step of invoking the copy of the network driver after a system crash further comprises the step of finalizing initialization of the copy of the network driver.

6. The method of claim 1 wherein the step of creating a reserve copy of the network driver into memory prior to a system crash comprises the steps of:
   disabling a running OS driver;
   initializing the copy of the network driver;
   disabling the copy of the network driver; and
   running the original OS driver.

7. The method of claim 6 wherein the step of invoking the copy of the network driver after a system crash comprises resetting the copy of the network driver to enable communication to the network.

8. The method of claim 1 wherein the emulated environment provides one or more network protocols and one or more application interfaces to support network applications.

9. The method of claim 8 wherein the network applications include debug-time network applications.

10. The method of claim 9 wherein debug-time network applications comprise system core dump, remote debug access, and crash diagnostics and repair.

11. A system for enabling communication over a predetermined network to a computer system that has crashed, comprising:
    identification means for identifying a network driver connected to the predetermined network;
    creation means for creating a reserve copy of the network driver in memory prior to a system crash;
    invocation means for invoking the copy of the network driver after a system crash; and
    emulation means for providing an emulated environment to enable the copy of the network driver to initialize, transmit, and receive network packets.

12. The system of claim 11 wherein the reserve network driver is an exact copy of the run-time network driver.

13. The system of claim 11 wherein the identification means for identifying a network driver connected to a predetermined network comprises scan means for scanning adapters to automatically detect an adapter connected to the predetermined network.

14. The system of claim 11 wherein the identification means for identifying a network driver connected to a predetermined network comprises selection means for selecting an adapter connected to the network from a list of possible adapters.

15. The system of claim 11 wherein the invocation means for invoking the copy of the network driver after a system crash further comprises the initialization means for finalizing initialization of the copy of the network driver.

16. The system of claim 11 wherein the creation means for creating a reserve copy of the network driver into memory prior to a system crash comprises:
    first disabling means for disabling a running OS driver;
    initialization means for initializing the copy of the network driver;
    second disabling means for disabling the copy of the network driver; and
    run means for running the original OS driver.

17. The system of claim 16 wherein the invocation means for invoking the copy of the network driver after a system crash comprises reset means for resetting the copy of the network driver to enable communication to the network.

18. The system of claim 11 wherein the emulated environment provides one or more network protocols and one or more application interfaces to support debug-time network applications.

19. A processor readable medium having processor readable code embodied therein for accessing data on a computer-based data accessing system, the processor readable medium comprising:

processor readable code for causing a processor to identify a network driver connected to a predetermined network;

processor readable code for causing a processor to create a reserve copy of the network driver in memory prior to a system crash;

processor readable code for causing a processor to invoke the copy of the network driver after a system crash; and processor readable code for causing a processor to provide an emulated environment to enable the copy of the network driver to initialize, transmit, and receive network packets.

20. The processor readable medium of claim 19 wherein the emulated environment provides one or more network protocols and one or more application interfaces to support debug-time network applications.

* * * * *